United States Patent [19]

Durow

[11] Patent Number: 4,804,093
[45] Date of Patent: Feb. 14, 1989

[54] METHOD AND APPARATUS FOR MECHANICALLY CLASSIFYING ROLLING BODIES

[75] Inventor: Kenneth M. Durow, Normoss, England

[73] Assignee: United Kingdom Atomic Energy Authority, London, England

[21] Appl. No.: 827,886

[22] Filed: Feb. 10, 1986

[30] Foreign Application Priority Data

Feb. 21, 1985 [GB] United Kingdom ............... 8504451

[51] Int. Cl.$^4$ ................................................ B07C 9/00
[52] U.S. Cl. .................................... 209/691; 198/391; 209/694; 209/707; 209/920
[58] Field of Search ............... 209/539, 707, 700, 691, 209/694, 940, 690, 689, 921, 920; 198/391, 757; 221/159, 163, 172

[56] References Cited

U.S. PATENT DOCUMENTS

| | | | |
|---|---|---|---|
| 2,494,939 | 1/1950 | Nance et al. | 209/940 |
| 3,578,142 | 5/1971 | Burgess | 198/391 |
| 3,900,107 | 8/1975 | Hoppmann | 209/707 |
| 4,059,189 | 11/1977 | John | 209/692 |
| 4,068,758 | 1/1978 | Abdul-Rahman | 209/691 |
| 4,118,309 | 10/1978 | Myers et al. | 209/691 |

FOREIGN PATENT DOCUMENTS

| | | | |
|---|---|---|---|
| 1033237 | 8/1985 | U.S.S.R. | 209/700 |
| 2030731 | 4/1980 | United Kingdom | 198/391 |

Primary Examiner—David A. Scherbel
Assistant Examiner—Donald T. Hajec
Attorney, Agent, or Firm—William R. Hinds

[57] ABSTRACT

A bowl feeder for separating damaged rolling bodies, for example nuclear fuel pellets, from sound ones includes a bowl (10) having a central conical section (12) for distributing the bodies radially outwardly towards a V-shaped circular channel (16) which ensures that the bodies are arranged end-to-end with the rolling axes orientated lengthwise of the channel. The channel (16) discharges the bodies one by one onto an outer sloping section (14) whose slope is sufficiently shallow to allow bodies with asymmetrical defects to resist rolling by virtue of the shift in their centres of gravity, while allowing defect free bodies to roll radially outwardly down the slope. A system of rails (22, 24, 26) with gaps (28, 30, 32) serves to separate defective bodies from those which are defect free, the latter being allowed to roll to the outer periphery of the bowl and eventually to a feed track (38) while the former are routed to a reject outlet (40).

16 Claims, 2 Drawing Sheets

METHOD AND APPARATUS FOR MECHANICALLY CLASSIFYING ROLLING BODIES

BACKGROUND OF THE INVENTION

This invention relates to a method and apparatus for mechanically classifying rolling bodies according to the degree of irregularity they exhibit. The invention has particular, but not necessarily exclusive, application to generally cylindrically-shaped pellets for use in the fuel, breeder material or control rods of nuclear reactors.

In for example the manufacture of ceramic nuclear fuel elements, the uranium and/or plutonium dioxide is formed into generally cylindrically-shaped pellets which are comparatively fragile and are prone to damage such as chipping. Defects such as chips, cracks and other irregularities lead to non-uniform heat output or conduction which is undesirable. When the defect is in the form of a chip in the pellet surface the major dimensions of the pellet (length and diameter) are largely unaffected and, apart from laborious and time-consuming visual inspection with the consequent contamination risks to the operator, the only solutions offered hitherto for distinguishing pellets with damage of this nature have tended to involve expensive optical recognition of some kind.

FEATURES AND ASPECTS OF THE INVENTION

The object of the present invention is to enable defective rolling bodies to be distinguished from those which are acceptable and, in the context of nuclear fuel pellet manufacture, to distinguish pellets with for example surface chips from substantially non-defective pellets.

According to one aspect of the invention there is provided a method of classifying bodies of a cylindrical shape each having a well-defined axis about which it can roll, so as to distinguish between those with asymmetrical defects from those without such defects, said defects being such that the tendency of the bodies to roll is reduced, said method comprising locating the bodies on a support surface, oscillating said surface to cause the bodies to move incrementally in the direction of the axes about which they are capable of rolling and guiding the bodies onto a separating zone of said surface which is inclined at a shallow angle and slopes generally transversely to the direction of incremental motion of said bodies whereby those bodies without significant asymmetrical defects are caused to roll down the inclined zone whilst those with such defects traverse the inclined zone without rolling to be separated from those which roll down the separating zone.

The invention is based on the recognition that a body with an asymmetrical defect will be less likely to roll (have reduced tendency to roll) on a suitably inclined surface because of the difference between its centre of gravity and that of a non-defective body. In practice, the angle of inclination can be determined empirically in accordance with the particular type of body under consideration and also the degree of asymmetry to be distinguished. In the case of nuclear fuel pellets, a separating zone with an inclination of 1° has been employed successfully.

The support surface may be constituted by the bowl or platform of a vibratory feeder and the oscillatory drive mechanism is preferably one which urges the bowl or platform to vibrate to and fro and up and down in a closed loop motion, the platform being resiliently supported for movement in two substantially perpendicular directions. Drive mechanisms which are particularly suitable for this purpose are disclosed in British Pats. Nos. 2030731 and 2073915 to which reference should be made for further details.

According to a second aspect of the invention there is provided apparatus for mechanically classifying rolling bodies according to the degree of asymmetry they possess, said apparatus comprising a resiliently mounted support platform onto which a plurality of said bodies can be loaded, said platform including a guide track for orientating the bodies with their rolling axes in a predetermined direction, and means for oscillating the platform in such a way that the rolling bodies are caused to move incrementally along the guide track towards a separating zone of said platform, said separating zone being inclined at a shallow angle and extending generally transversely of the guide track whereby, as said bodies are fed onto the separating zone, those without substantial asymmetrical defects roll down said inclined zone whereas those with such defects continue to move incrementally across the inclined zone without rolling.

The apparatus may include means for collecting the defective bodies after they have traversed the separating zone.

Preferably, the platform includes more than one separating zone so arranged that those bodies which roll down the first inclined zone are guided to a second inclined separating zone and those which roll down the latter may be guided to a further inclined separating zone or zones. If desired, each subsequent separating zone may have a steeper or shallower angle of slope than the preceding one.

As mentioned previously, the oscillatory drive means is preferably arranged to urge the platform to vibrate up and down and to and fro in a closed loop motion so as to impart said incremental movement to the bodies, for example as disclosed in British Patent Nos. 2030731 and 2073915.

DESCRIPTION OF THE DRAWINGS

The invention will now be described by way of example only with reference to the accompanying drawings, in which.

DESCRIPTION OF A PREFERRED EMBODIMENT

Figure 1:
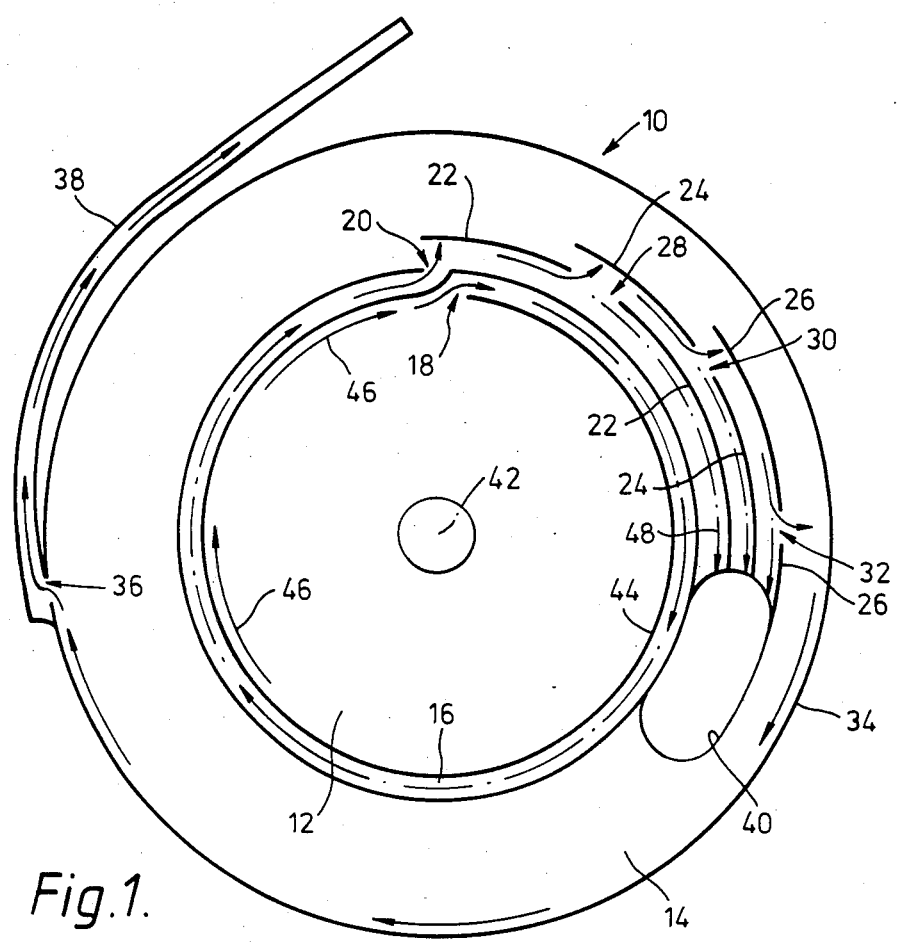
FIG. 1 is a plan view of the vibratory bowl or platform of the invention.
Figure 2:
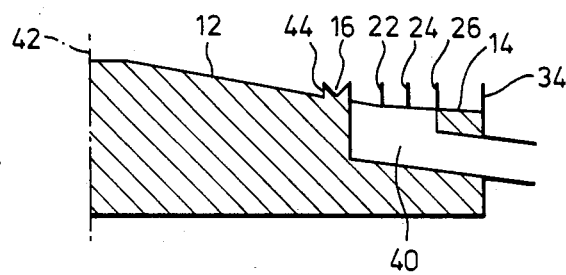
FIG. 2 is a radial section of the bowl in the region of the reject outlet thereof.

The bowl shown in FIGS. 1 and 2 is intended for the separation of damaged nuclear fuel pellets from sound pellets and feeding the sound pellets in end to end relation to a fuel can loading station (not shown). The bowl 10 comprises a relatively steep-angled generally conical central loading section 12 and a somewhat more shallowly inclined, annular outer section 14 separated from the central section by a circumferential V-shaped channel or groove 16 having an inlet 18 opening towards the central section 12 and an outlet 20 opening towards the outer section 14.

Adjacent the outlet 20, the outer section 14 is provided with three part-circular guide rails 22, 24, 26 which are offset radially and have their trailing edges offset circumferentially. Each rail is interrupted by an opening 28, 30, 32 which is in radial overlapping relation with the adjacent rail 24, 26 in the case of openings 28, 30. The opening 32 faces a rail 34 which extends around the full circumference of the bowl apart from an outlet opening 36 which leads to a feed track 38 for advancing pellets to the fuel can loading station. The rails 22, 24 and 26 bound part-circumferential pathways which lead towards a common outlet 40 in the bowl. The rail 34 bounds a circumferential pathway which extend past the outlet 40.

Figure 3:
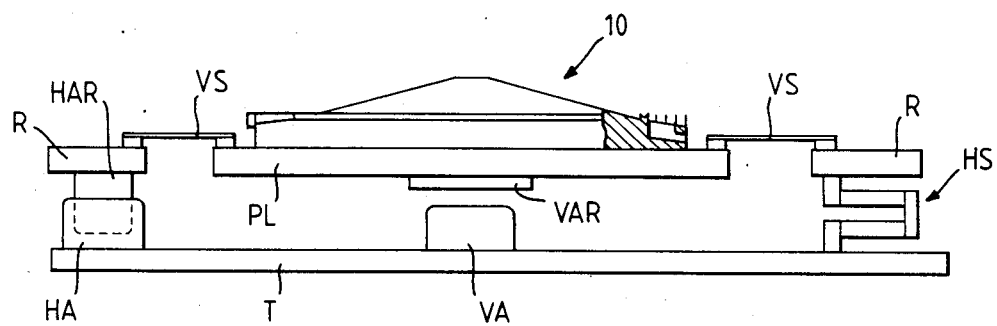
FIG. 3 is a diagrammatic view of the bowl mounted on a drive arrangement for oscillating the bowl horizontally and vertically in a closed loop motion.

The bowl is mounted for torsional oscillation about its generally vertically disposed central axis 42 and for up and down oscillation generally parallel to its axis 42. It is urged to oscillate in these two substantially perpendicular directions in a closed loop path by a suitable drive arrangement which allows the amplitudes and phases of the two modes of oscillation to be varied independently for each mode and so that the bowl is self-emptying. The resilient mounting arrangement and the oscillatory drive mechanism may be as described in British Patent Nos. 2030731 and 2073915 and will be briefly described with reference to FIG. 3. As shown, the bowl 10 is mounted on a plate PL within the confines of a ring R and above a table T. The ring R is attached to table T by spring units HS which constrain the ring R to resilient displacement relative to the table T in a horizontal direction. The plate PL is coupled to the ring R by spring units VS which constrain the plate PL to resilient displacement relative to the ring R in a vertical direction. Horizontal electromagnetic drive actuators HA (one only shown) cooperate with armatures HAR to oscillate the ring R and plate PL about a vertical axis. Similarly a vertical electromagnetic drive actuator VA cooperates with an armature VAR to oscillate the plate PL in the vertical direction, the net effect of actuators HA and VA being to impart a closed loop compound motion to the plate PL and the bowl 10.

In use, pellets are trickle fed from a hopper (not shown) onto the central section 12 and roll down until they contact the inner shoulder 44 of the groove 16. This assists in orientating the generally cylindrical pellets with their rolling axes extending generally circumferentially. The vibratory motion of the bowl is transmitted to the pellets which progressively increment their way around the inner shoulder 44 of the groove 16 in the direction indicated by arrows 46 until they arrive at inlet 18 whereupon they enter the groove 16. Any pellets which remain disorientated at this point will automatically be correctly orientated upon entry into the groove 16. The pellets continue to increment their way around the groove until they reach the outlet 20 where they are guided into the pathway bounded by rail 22 and continue their incremental movement in the same circumferential direction while maintaining the correct orientation.

At this stage, the pellets are located on the shallow slope of the outer section 14. When each pellet registers with the opening 28, it is no longer constrained by the rail 22 against moving radially outwardly and, in the case, of a sound pellet having no substantial asymmetrical defects it will roll down the slope until it contacts the next rail 24. The same thing will happen at opening 30 and 32 so that a sound pellet will eventually contact the rail 34 and eventually be incremented into the feed track 38.

However, a defective pellet with, for example, an asymmetrically disposed chip in its surface will be less likely to roll, or have reduced tendency to roll, when it is located on the slope without any radial constraint from the rails 22, 24, 26 and, consequently, such pellets traverse the openings 28, 30, 32 without rolling down the slope. For instance, a damaged pellet instead of rolling down the slope and into contact with rail 24 may traverse the opening 28 without rolling and continue along the pathway indicated by arrow 48 until it drops into the outlet 40 which may feed the pellets to a damaged pellet store. A damaged pellet may, however, roll on the slope at opening 28 depending upon the location of the defect therein. In this event, the damaged pellet rolls into contact with the rail 24 and the radial spacing between the rails may be such that the rolling movement will serve to relocate the angular position of the defect and increase the likelihood that the pellet will not roll when it registers with the opening 30. Thus, with the illustrated embodiment, there are three separating zones at which non-rolling of a damaged pellet may occur thereby improving separation of damaged pellets from sound ones even if the angular position of the defect in a damaged pellet is unfavourable to ensure non-rolling in one or more of the separating zones. It will be seen that only pellets which roll at all three openings 28, 30 and 32 will be able to negotiate the path leading to the outlet 36; all other pellets will end up in the reject outlet 40.

The slope of the outer section 14 may be determined empirically but will, in general, be of a very shallow angle to the horizontal; an angle of inclination of 1° to the horizontal has been used successfully for ceramic nuclear fuel pellets. Typically the angle of inclination of the central section will be of the order of 15° to the horizontal. Where separation of sound and damaged pellets is effected at more than one zone as in the illustrated embodiment, the shallow slopes associated with the zones may, if desired, differ progressively.

The feed track 38 may be provided with means for limiting the number of pellets fed to the bowl from the hopper and/or allowed to enter the track 38. For example, when the line of pellets travelling along the track 38 reaches a certain length further supply of pellets from the hopper may be temporarily terminated. By arranging for the track to be continually filled to a certain length, it is possible to obtain a substantially constant pushing force. When the required length is achieved, sound pellets in the bowl may continue to recirculate around the bowl and trickle feed from the hopper can be regulated to limit the number of pellets being recirculated.

I claim:

1. A method of classifying bodies of cylindrical shape, each having a well-defined axis about which it can roll, so as to distinguish between those with asymmetrical defects from those without such defects, said defects being such that the tendency of the bodies to roll is reduced, said method being characterised by locating the bodies on a support surface, oscillating said surface to cause the bodies to move incrementally in the direction of the axes about which they are capable of rolling and guiding the bodies onto a separating zone of said surface which is inclined at a shallow angle and slopes generally transversely to the direction of incremental motion of said bodies whereby those bodies without significant asymmetrical defects are caused to roll down the inclined separating zone whilst those with such defects traverse the inclined separating zone without rolling to be separated from those which roll down said separating zone.

2. A method as claimed in claim 1 in which said bodies are caused to follow a part-circular path of movement and said zone slopes downwardly in a radially outward direction.

3. A method as claimed in claim 1 in which said bodies are constrained against rolling movement as they are advanced towards said zone and in which the constraint is removed at said zone.

4. A method as claimed in claim 1 in which said support surface is oscillated with an angular motion in a generally horizontal plane and with a substantially linear motion in a generally vertical direction so that the surface is caused to follow a closed loop motion which causes the bodies to move incrementally in the direction of the axes about which they are capable of rolling.

5. A method as claimed in claim 4 including varying the phase between said generally horizontal and vertical components of motion.

6. A method as claimed in claim 1 including successively advancing said bodies across said separating zone and at least one further separating zone.

7. A method as claimed in claim 6 including changing the position of contact between each body and said surface after the body has rolled down a preceding separating zone.

8. A method as claimed in claim 6 in which the angle of slope differs from one separating zone to the next.

9. Apparatus for mechanically classifying bodies of cylindrical shape, each having a well-defined axis about which it can roll, the classification being according to the degree of asymmetry they possess so as to distinguish between those with asymmetrical defects from those without such defects, said defects being such that the tendency of the bodies to roll is reduced, said apparatus comprising a resiliently mounted support platform onto which a plurality of said bodies can be loaded, said platform including a guide track for orientating the bodies with their rolling axes in a predetermined direction, and means for oscillating the platform in such a way that the rolling bodies are caused to move incrementally along the guide track towards a separating zone of said platform, the separating zone being arranged to intercept the guide track so that all the bodies emerge from the guide track onto the separating zone, said separating zone being inclined at a shallow angle and extending generally transversely of the guide track whereby, as said bodies are fed onto the separating zone, those without substantial asymmetrical defects roll down said inclined separating zone whereas those with such defects continue to move incrementally across the inclined separating zone without rolling to be separated from those which roll down said inclined separating zone.

10. Apparatus as claimed in claim 9 including means for collecting the defective bodies after they have traversed the separating zone.

11. Apparatus as claimed in claim 9 including, in addition to the first-mentioned separating zone, at least one further separating zone whereby those bodies which roll down at least the first-mentioned separating zone are subsequently confronted by said at least one further separating zone.

12. Apparatus for mechanically classifying rolling bodies according to the degree of asymmetry they possess, so as to distinguish between those with asymmetrical defects from those without such defects, said defects being such that the tendency of the bodies to roll is reduced, each body having a well defined axis about which it can roll, said apparatus comprising a resiliently mounted support platform onto which a plurality of said bodies can be loaded, said platform including a guide track for orienting the bodies with their rolling axes in a predetermined direction, and means for oscillating the platform in such a way that the rolling bodies are caused to move incrementally along the guide track toward a separating zone of said platform, said separating zone being inclined at a shallow angle and extending generally transversely of the guide track whereby, as said bodies are fed onto the separating zone, those without substantial asymmetrical defects roll down said inclined separating zone whereas those with such defects continue to move incrementally across the inclined separating zone without rolling to be separated from those which roll down the separating zone, the apparatus including, in addition to the first-mentioned separating zone, at least one further separating zone whereby those bodies which roll down at least the first-mentioned separating zone are subsequently confronted by said at least one further separating zone, in which said guide track includes at least two guide track sections each preceding a respective separating zone, the second and any subsequent track sections being arranged to receive any bodies which roll down the preceding separating zone.

13. Apparatus as claimed in claim 9 in which the guide track is of circular configuration.

14. Apparatus as claimed in claim 9 in which said platform includes a central section of generally conical configuration onto which said bodies are loaded, an orientation channel forming part of said guide track and extending around said central section for receiving said bodies from the central section and ensuring that the bodies are arranged in succession with their rolling axes orientated lengthwise of the channel, and an annular outer section for receiving the orientated bodies from said channel and which slopes downwardly in a radially outward direction, the angle of inclination of said outer section being sufficiently shallow to allow bodies with asymmetrical defects to resist rolling, the outer section being provided with at least one circumferentially extending guide track formation which constrains the bodies to move in a circumferential direction around said outer section, gaps being provided in said at least one guide track formation to form said separating zones in which the bodies are unconstrained on the sloping outer section so that the bodies can roll radially outwards if substantially free of asymmetrical defects.

15. Apparatus as claimed in claim 9 in which the oscillatory drive means is arranged to urge the platform to vibrate up and down and angularly to and fro in a closed loop motion.

16. Apparatus as claimed in claim 12 in which each guide track section is of circular configuration.

* * * * *